United States Patent
Dinh

(10) Patent No.: US 7,241,952 B2
(45) Date of Patent: *Jul. 10, 2007

(54) HINGED WEATHERPROOF ELECTRICAL BOX COVER

(75) Inventor: Cong Thanh Dinh, Collierville, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/901,392

(22) Filed: Jul. 28, 2004

(65) Prior Publication Data

US 2005/0006125 A1   Jan. 13, 2005

Related U.S. Application Data

(63) Continuation of application No. 10/353,121, filed on Jan. 28, 2003, now Pat. No. 6,891,104.

(51) Int. Cl.
  *H05K 5/03*  (2006.01)
(52) U.S. Cl. .................... 174/67; 174/66; 220/241; 439/139
(58) Field of Classification Search .................. 174/67, 174/51.2, 66, 57, 58, 50, 52.1, 50.51, 50.54, 174/53; 439/11, 139, 147, 31, 165, 142, 439/144, 136; 220/241, 242
  See application file for complete search history.

(56) References Cited

U.S. PATENT DOCUMENTS 4,688,596 A * 8/1987 Liebmann et al. .......... 137/360

5,280,135 A * 1/1994 Berlin et al. ................. 174/67

(Continued)

OTHER PUBLICATIONS

Intermatic Flexi-Guard In-Use Weatherproof Receptacle Covers, Introducing our most flexible designs yet, Brochure, 2000.

(Continued)

*Primary Examiner*—Dhiru R. Patel
(74) *Attorney, Agent, or Firm*—Hoffman & Baron, LLP

(57) ABSTRACT

The present invention is directed to a weatherproof electrical outlet box assembly for shielding and protecting electrical components from moisture including a faceplate for attaching to an outlet box, the faceplate being substantially planar, and perimetrically bounded by a substantially rectangular side edge, the faceplate having at least one aperture for receiving an electrical component and; the faceplate including a first hinge socket and a second hinge socket extending respectively from the side edge in substantially orthogonal orientation. The weatherproof electrical outlet box assembly further including a cover having a front wall, an opposed open end and a substantially rectangular perimetrical side wall therebetween defining a cover interior, the side wall having a rim bounding the open end, the cover including at least one access port through the side wall adjacent the open end for providing separate passageways into the interior of the cover; the cover including a first hinge pin and a second hinge pin extending respectively from the side wall adjacent the open end in substantially orthogonal orientation; and the cover being pivotally affixed to the faceplate by operative engagement of the hinge socket with the hinge pin of corresponding orientation and movable between an open and a closed position and wherein the hinge pin and the hinge socket that are not in operative engagement are not aligned.

27 Claims, 8 Drawing Sheets

U.S. PATENT DOCUMENTS

| | | |
|---|---|---|
| 5,763,831 A | 6/1998 | Shotey et al. |
| D400,507 S * | 11/1998 | Monaco .................... D13/156 |
| 6,133,531 A * | 10/2000 | Hayduke et al. .............. 174/67 |
| 6,179,144 B1 * | 1/2001 | Abroy et al. ................ 220/3.8 |
| 6,420,653 B1 | 7/2002 | Shotey et al. |
| 6,441,307 B1 | 8/2002 | Shotey et al. |
| 6,891,104 B2 | 5/2005 | Dinh |

OTHER PUBLICATIONS

Intermatic Flexi-Guard, Catalog pp. 5-6, www.intermatic.com/images/catalog/groups/2004-TS89_WP.pdf.

Intermatic Weatherproof Products, www.intermatic.com/?action=div&did=24, Aug. 17, 2005.

\* cited by examiner

HINGED WEATHERPROOF ELECTRICAL BOX COVER

CROSS REFERENCE TO RELATED APPLICATION

This application is a continuation of U.S. application Ser. No. 10/353,121 filed Jan. 28, 2003 now U.S. Pat. No. 6,891,104.

FIELD OF THE INVENTION

This invention relates to a hinged electrical connection box cover for covering electric and/or electronic components, having a cover body, comprising a bottom and side walls, and open top defined by the said walls, wherein the cover can be closed over a selectively interchangeable faceplate, that is rigidly mounted to accommodate an electrical component and pivotally attached to the cover wherein the hinged front cover can be opened and closed whether the faceplate is oriented about either a horizontal or vertical axis, and provide weatherproof protection to the electrical component.

BACKGROUND OF THE INVENTION

Electrical boxes are used for a variety of applications wherein it is necessary to provide a termination point for electrical wires for splicing or connection to an electrical component. An electrical box is rigidly mounted on or in a wall in such locations to conveniently locate an electrical component. Depending on the application and location, electrical boxes can be mounted either in a horizontal or vertical orientation. Once mounted, the wires installed and connected to the electrical component therein, the box is closed with a face plate. The face plate must be chosen to match the installed electrical component, and covers the top opening of the connector box, thus preventing any damage to the components mounted in the box or accidental contact with live electrical wires.

Due to the varied needs for electrical power and switching, it is sometimes necessary to mount a box in a location where it will be exposed to wet conditions. Typically, such installations can include an outdoor receptacle to provide electricity for lighting, power tools or appliances. When used in a location where the connector box will be exposed to water, it is necessary to provide for structure to ensure that water does not enter the box and thereby damage the components therein or cause a "short circuit". An effective way to prevent water from entering an electrical box is to provide a cover for the faceplate thus providing a weatherproof seal.

It would therefore be desirable to have an electrical connector box cover that can provide a weatherproof seal, with an exchangeable faceplate wherein the cover can be adapted to be used with a connector box that is mounted in either a horizontal or vertical orientation. Additionally it would be desirable to provide for a hinge on the faceplate such that the cover can be pivotally opened for gaining easy access to the components that are shielded by the cover. Additionally it would be useful for the cover to be adapted to be opened when the faceplate is oriented in either the horizontal or vertical direction without the need to modify the cover or the faceplate and provide a locking mechanism whereby the cover can be secured regardless of which position the box is mounted.

SUMMARY OF THE INVENTION

The present invention is therefore directed to a weatherproof electrical outlet box assembly for shielding and protecting electrical components from moisture comprising a faceplate for attaching to an outlet box, the faceplate being substantially planar, and perimetrically bounded by a substantially rectangular side edge, the faceplate having at least one aperture for receiving an electrical component and; the faceplate including a first hinge socket and a second hinge socket extending respectively from the side edge in substantially orthogonal orientation. The present invention further including a cover having a front wall, an opposed open end and a substantially rectangular perimetrical side wall therebetween defining a cover interior, the side wall having a rim bounding the open end, the cover including a at least one access port through the side wall adjacent the open end for providing separate passageways into the interior of the cover; the cover including a first hinge pin and a second hinge pin extending respectively from the side wall adjacent the open end in substantially orthogonal orientation; and the cover being pivotally affixed to the faceplate by operative engagement of the hinge socket with the hinge pin of corresponding orientation and movable between an open and a closed position and wherein the hinge pin and the hinge socket that are not in operative engagement are not aligned.

DETAILED DESCRIPTION OF THE PREFERRED EMBODIMENT

Figure 1:
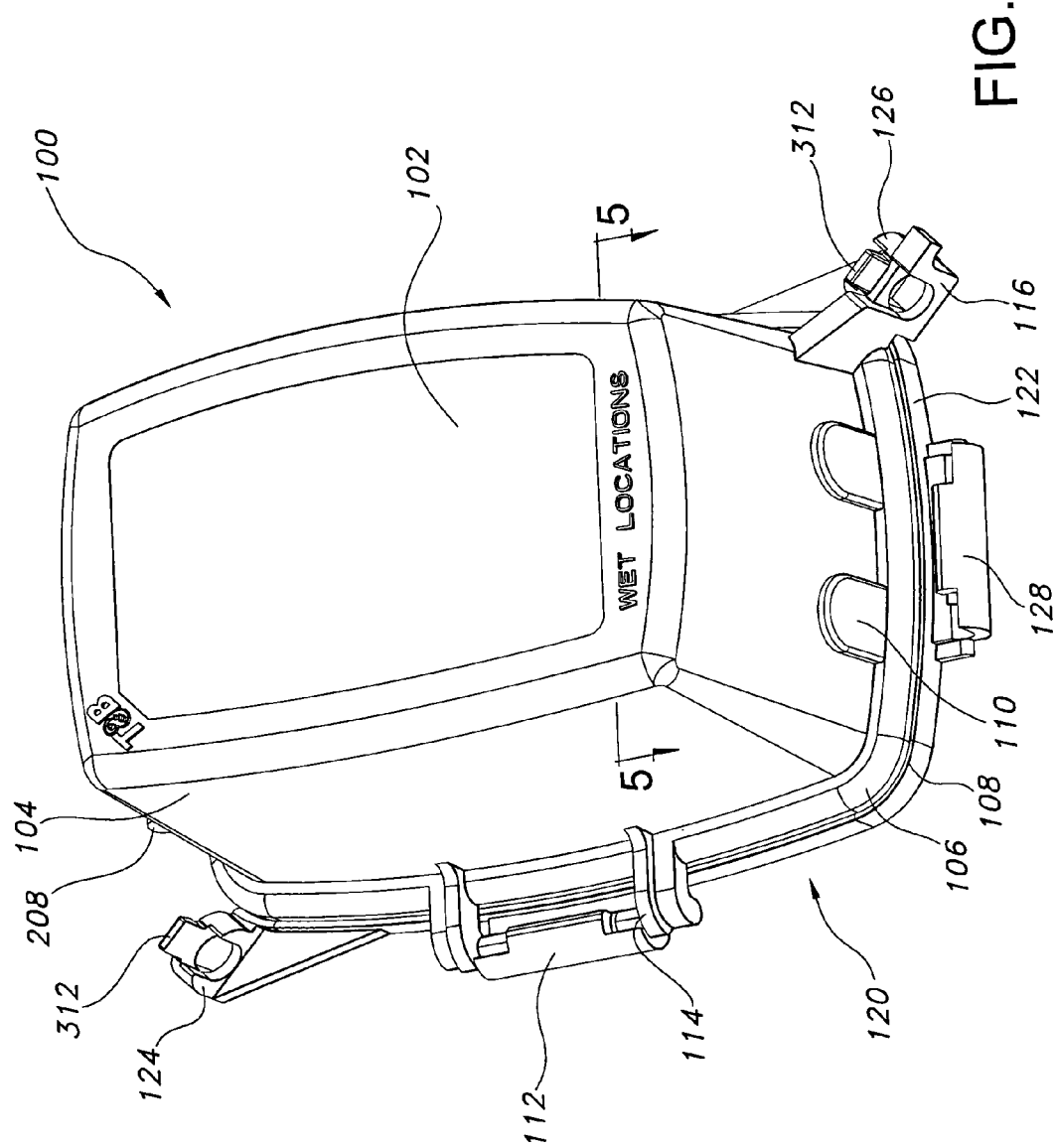
FIG. 1 is a perspective view of the front of the electrical connector box cover and attached faceplate in a horizontal position, the cover and faceplate being in a closed position.

There will be detailed below the preferred embodiments of the present invention with reference to the accompanying drawings. Like members are designated by like reference characters in all figures.

The present invention is directed to a weatherproof cover for an electrical connector box for providing water protection to components accommodated therein without the use of a gasket, having selectively interchangeable faceplates for adaptation to a variety of electrical components and which can be utilized with a connector box mounted in either a horizontal or vertical orientation.

Turning now to FIG. 1, the electrical connector box cover 100 of the present invention is shown. The electrical connector box cover 100 is a generally rectangular box-like member having a substantially planar rectangular front 102 that is perimetrically bounded by an outer wall 104, that is comprised of four substantially planar side walls having two sets of substantially parallel sides. The outer wall 104 extends backwardly from the front 102 and has an outwardly flanged rim 106 at the back with an outside edge 108. The rim 106 is preferably integrally formed on cover 100 as a single piece component.

Depicted on outer wall 104 is a conventional plug knockout 110 of a type which is known in the art. The knockout 110 is a partially cut through opening or removable wall section. The knockout 110 is removed to create an opening through which a wire may pass for electrical connection to the enclosed device. In the embodiment shown, once the knockout has been removed it cannot be reinstalled. While knockout 110 is depicted on one surface of outer wall 104, it will be appreciated that a plurality of knockouts can be positioned on any surface of the outer wall. It should be noted that while the edge of knockout 110 does not appear to extend onto flanged rim 106, as will be seen in FIG. 2, the partially cut through opening on the inside of outer wall 104 reaches the edge of the outer flange. Therefore, the portion of rim 106 adjacent the knockout 110 is removed to form an unobstructed aperture. In addition, in FIG. 1 there is depicted horizontal hinge socket 112 in pivotal engagement with horizontal cover hinge pin 114. Cover locking device 116 is also shown in operative engagement with faceplate locking member 126 as explained in greater detail with respect to FIG. 3. As is well known, cover housing 100 may be formed of a variety of materials. In the particular embodiment depicted here, cover housing 100 is integrally formed of an injection molded, high impact synthetic plastic material, such as for example, clear Lexan.

With further reference to FIG. 1, horizontally oriented cover 100 is shown in a closed position with respect to a faceplate 120. Shown in FIG. 1 is faceplate side edge 122, faceplate locking devices 124 and 126, and faceplate vertical hinge socket 128. Locking devices 124 and 126, extend from diagonally opposed corners of faceplate side edge 122 and are adapted to be fastened to complementary cover locking device 116. Locking device 126 is shown in locking engagement with cover locking device 116 as described below. In this view, cover 100 is depicted as pivotally engaged to faceplate 120 in a horizontal orientation. As will be further described and depicted in FIG. 2, cover 100 can also be pivotally engaged to faceplate 120 in a vertical orientation.

Turning again to FIG. 2, there is shown vertically oriented cover 100 of the present invention depicted in an open position with respect to faceplate 120. Visible in the open position is the interior of rectangular front 102 and outer wall 104, having an edge 202 that defines an opening into cover interior 204, exterior rim 206 and vertical cover hinge pin 208 which is oriented horizontally during use. Visible on the interior surface of outer wall 104 are the partially cut through openings 209 forming knockouts 110. Faceplate 120 has an inside surface 210 (facing the inside of cover 100) and an outside surface 212 (not visible), perimetrically bounded by a side edge 122. The faceplate depicted is adapted to accommodating a single duplex receptacle, having a pair of openings 214, which are positioned such that the faceplate will fit flush over the duplex receptacle when installed. However, faceplate 120 may be modified and configured to adapt to any number of electrical components, as depicted and described for example, in FIGS. 6 and 7.

There is further shown a plurality of holes 216a and 216b for receiving fasteners, for example screws to attach the faceplate to a variety of different components, such as a duplex receptacle. Vertical hinge socket 128 (which is oriented horizontally during use) extends from side edge 122 for pivotally connecting to the vertical hinge pin 208. There is further defined on the outside surface of the faceplate, a continuous protrusion 220 around the perimeter of the faceplate. Protrusion 220 is preferably integrally formed on the faceplate and is positioned on the faceplate such that it aligns with the inside edge of the outwardly flanged rim to form a seal as described below. A concave channel 222 is positioned along the inside edge of the continuous protrusion 220. Concave channel serves to provide a barrier to water migration into the interior of cover 100 along the inside surface of faceplate 120.

Figure 3:
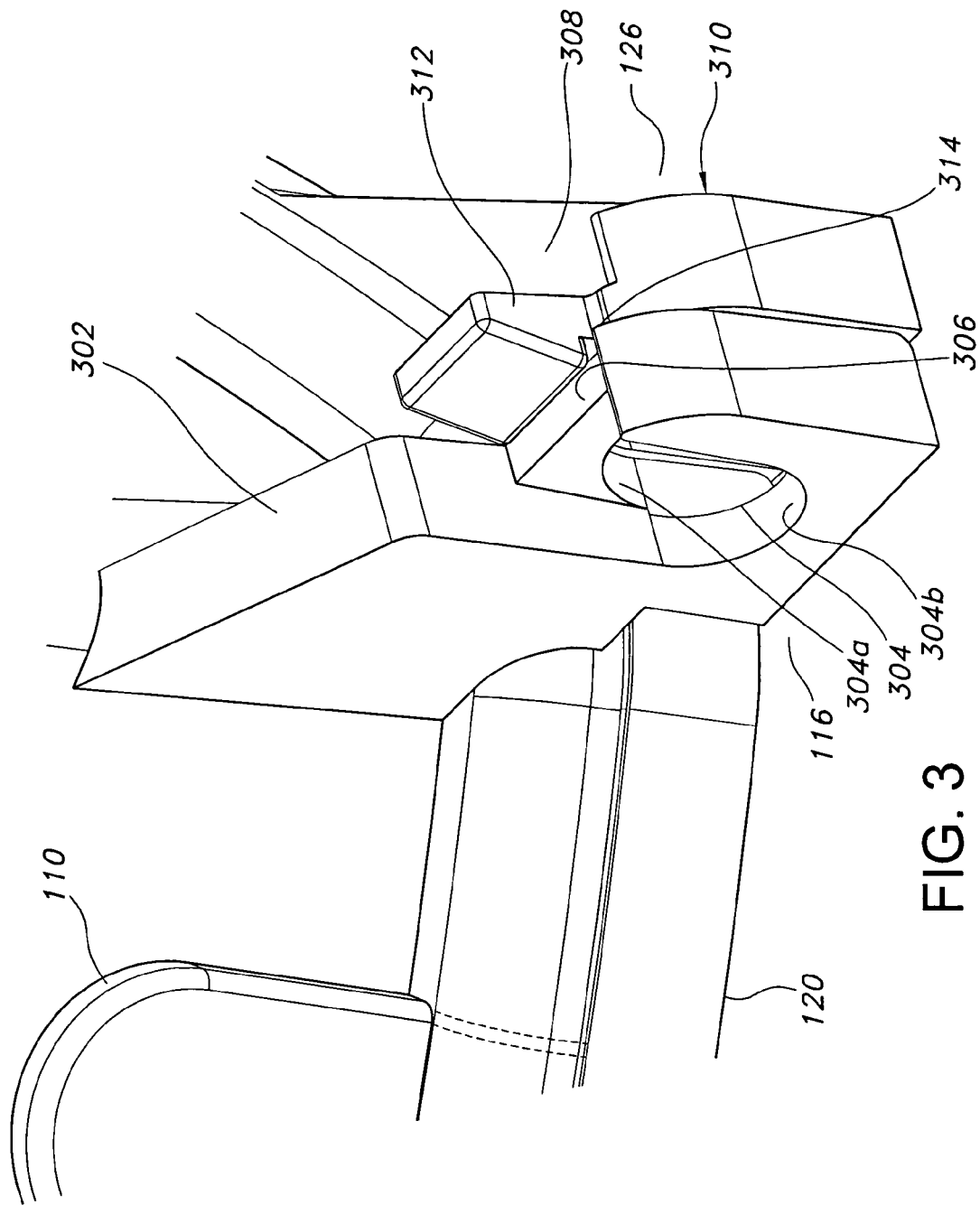
FIG. 3 is a detailed perspective view of the locking device and hinge of the electrical connector box and faceplate according to the present invention.

Turning now to FIG. 3 there is shown a detailed view of a portion of the exterior of cover 100 and faceplate 120 showing cover locking device 116 and faceplate locking device 126. The same will also be true with respect to faceplate locking device 124. More particularly, FIG. 3 shows locking device 126 in locking engagement with cover locking device 116. Cover locking device 116 comprises a stanchion 302 supporting an annular ring 304 comprised of an inside semi circle 304a, and outside semi circle 304b and a locking tab support lip 306. Faceplate locking device 126 comprises a support 308 stanchion, an annular ring (not visible) which is comprised of an inside semi circle and an outside semi circle, similar to structures 304a and 304b, and a locking tab 312. Annular ring 304 is adapted to align concentrically with the complementary structure on faceplate locking device 124 or 126, and provides a passage through which a conventional lock shank of a padlock or other locking device (not shown) may be inserted. The lock can be a padlock, opened by key or combination. Annular ring 304 and the annular ring of locking device 124 and 126 are formed of offset semicircular portions thereby providing a gap between the structures for locking tab 312 to pass through. Furthermore, the locking device includes a snap closure mechanism that can be of a variety of types that are well known in the latching arts. In this exemplary embodiment depicted, the snap closure mechanism comprises the locking tab support lip 306 and locking tab 312. Tab 312 is a post having four sides, projecting upwardly from faceplate locking device 124 or 126, wherein the side located adjacent the cover locking device has a ramped or angled surface, with a notch 314 below the angled surface adapted to engage locking tab support lip 306 as shown in FIG. 3. The tab 312 is shown extending upwardly from locking device 124 and 126. Both the tab 312 and tab support lip 306 are preferably formed integrally with cover 100 and faceplate 120 respectively from a resilient material.

In operation, when cover 100 is pivotally engaged to faceplate 120 and rotated to a closing position, cover locking device 116 passes faceplate locking device 124 or 126, whereby resilient locking tab 312 is elastically deformed laterally away from locking device 116, until cover 100 is in the fully closed position. Once cover is fully closed, locking tab 312 springs back to its original position to releasably secure cover 100 on faceplate 120 whereby notch 314 engages locking tab support lip 306. At the same time annular ring 304 and the annular ring of locking device 124 or 126 are concentrically aligned in order to permit the insertion of a lock such as a pad lock. In the specific embodiment of FIGS. 1 and 2, two locking devices 124 or 126 having resilient tabs 312 are provided on faceplate 120, located at the edge of the faceplate on diagonally opposed corners for securely retaining the cover 100 against the faceplate 120. To open cover 100, the resilient tab 312 is manually bent away from locking device 116, whereby notch 314 disengages from locking tab support lip 306, permitting opening of the cover. By providing a cover and faceplate with a snap closure mechanism, the cover can be closed securely and tightly, thus maintaining a tight seal between the cover and faceplate.

Figure 4:
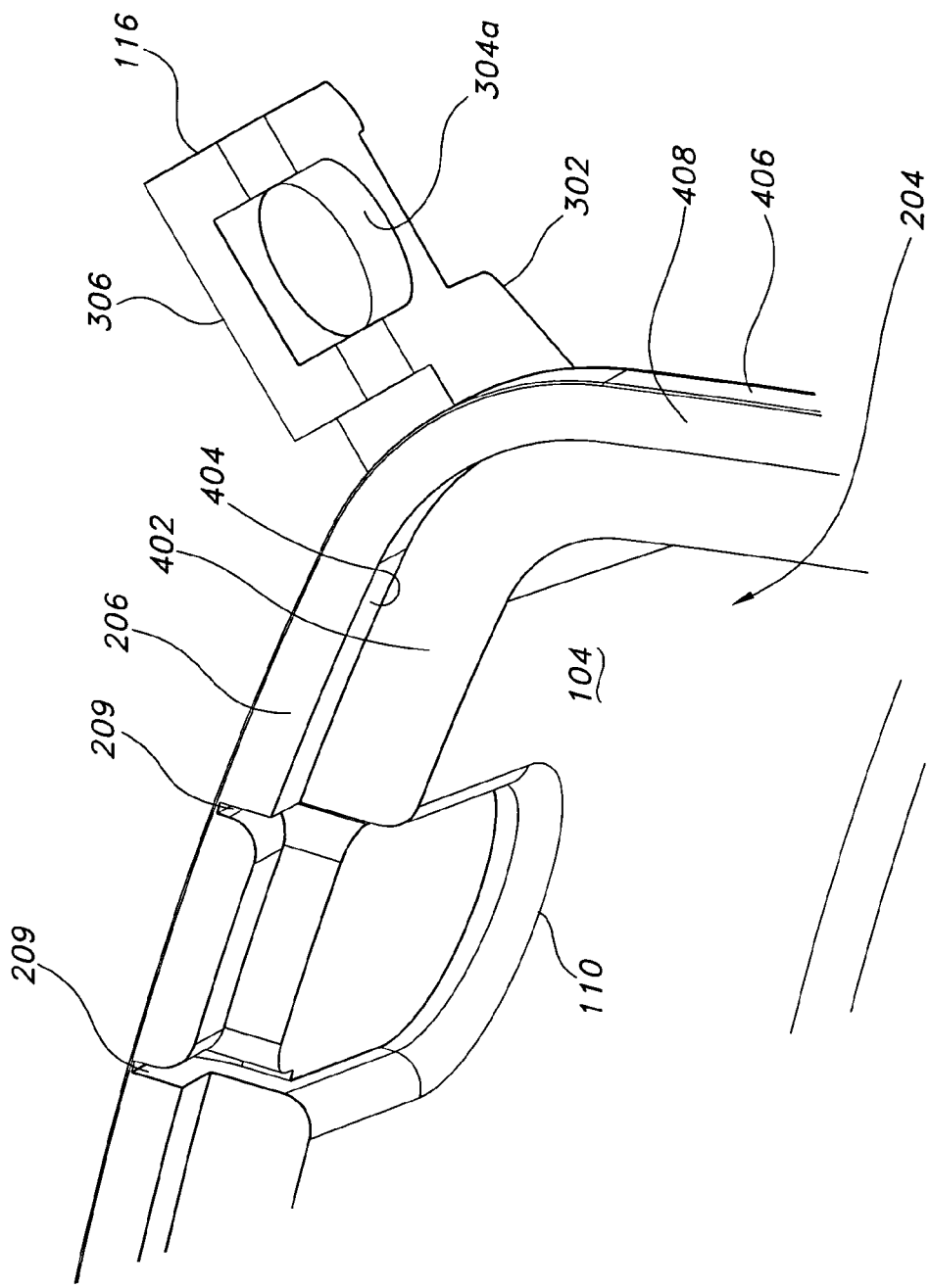
FIG. 4 is a detailed perspective view of the inside of electrical connector box cover rim and knockout according to the present invention.

Turning now to FIG. 4, there is shown a detailed view of a portion of cover interior 204. More particularly there is shown, cover support ledge 402, exterior rim 206, having an inside edge 404, an outside edge 406 and a top edge 408. Further, visible on the interior surface of outer wall 104 are the partially cut through openings 209 of knockouts 110. The partial cut through opening comprises a "u-shaped" incision on the interior of outer wall 104 and exterior rim 206. The incision weakens the outer wall and rim structure whereby a portion of that wall, the knockout 110, can be easily removed to create a passage way through the cover. As previously noted, the partially cut through opening 209, extends to the exterior rim 206, thereby enabling removal of that portion of rim 106.

Figure 5:
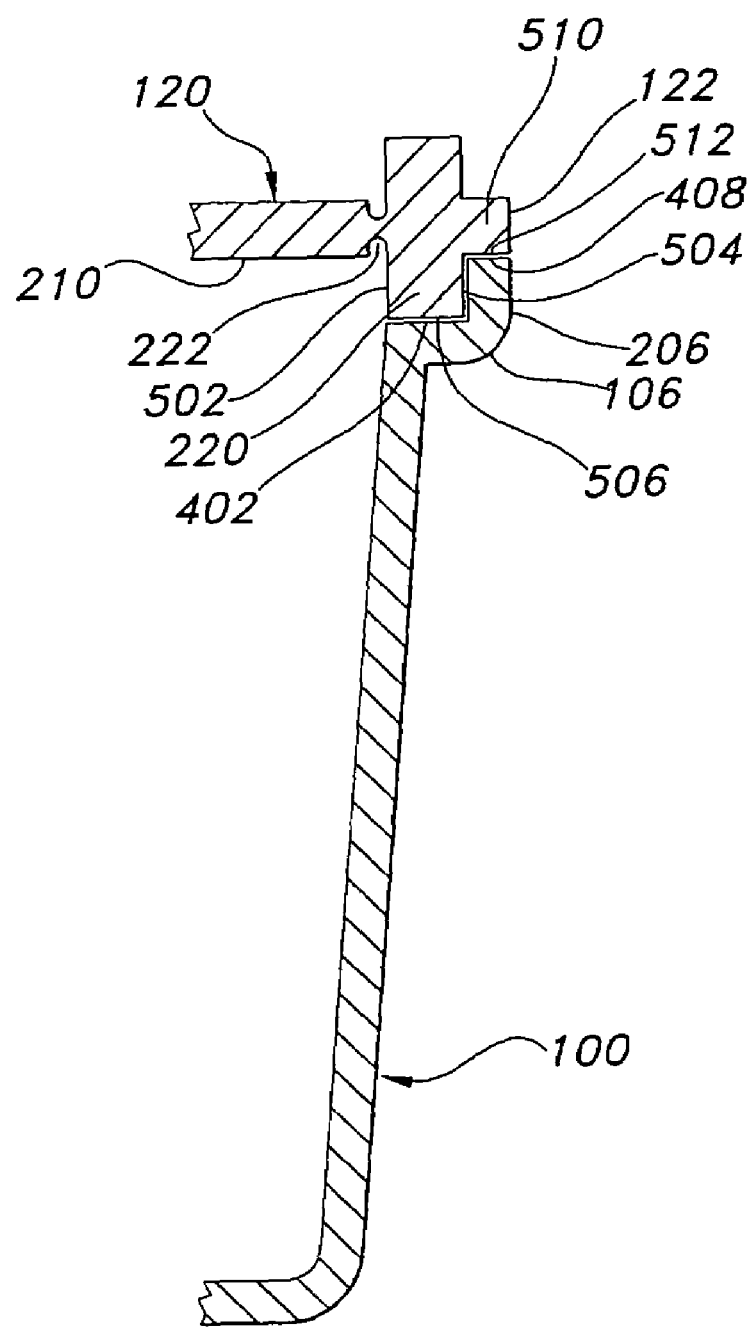
FIG. 5 is a partial cross-sectional view of the electrical connector box cover and faceplate according to the present invention as seen along viewing lines V-V of FIG. 1.

FIG. 5 depicts the cover 100 and faceplate 120 of the current invention as described above along cross-section V-V of FIG. 1. Extending from the inside surface 210 of faceplate 120 is continuous protrusion 220, located around the perimeter of the faceplate and having an inner periphery 502, an outer periphery 504 and a intermediate sealing surface 506. Extending from the edge of the outer periphery 504 to side edge 122 is faceplate lip 510 wherein the bottom surface forms an outer sealing surface 512. Located along the inner periphery 502 of continuous protrusion 220 is a concave channel 222 that forms a depression in the surface of the faceplate. When cover 100 is closed, inner sealing surface 506 bears upon cover support ledge 402 and outer sealing surface 512 bears upon top edge 408 of cover 100 to form a seal.

In use, when cover 100 is closed, any water which may fall on the cover is channeled away from the cover and faceplate joint by the outwardly flanged rim 106. Furthermore, there is a mechanical barrier to prevent water from entering cover 100 by means of a close tolerance fit between the outer sealing surface 512 and the flange top edge 408. In addition, there is a secondary mechanical barrier by means of a close tolerance fit between the support ledge 402 and inner sealing surface 506.

Figure 6:
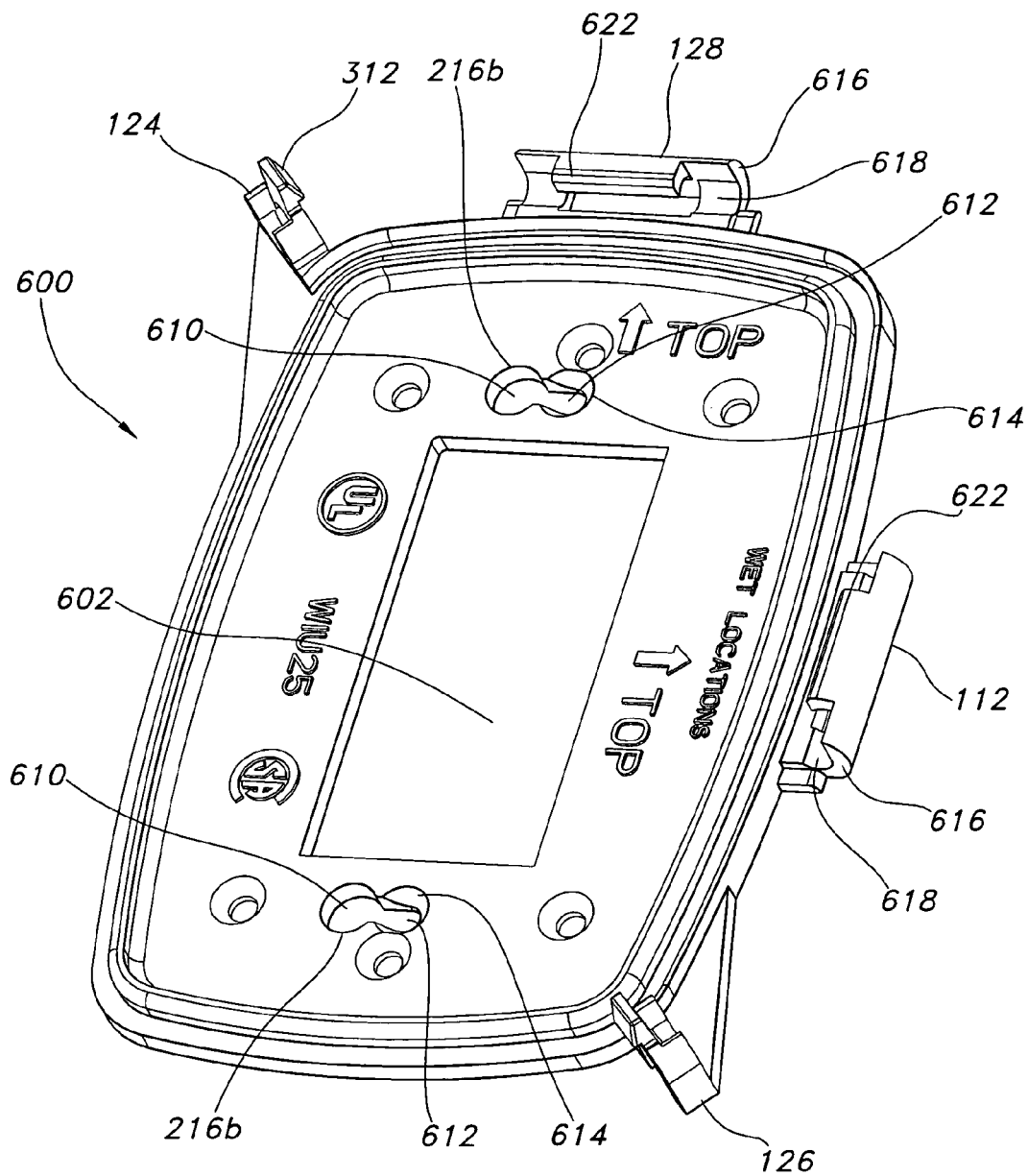
FIG. 6 is a perspective view of an alternate embodiment of the faceplate according to the present invention.

Now turning to FIG. 6 there is shown a perspective view of the outside surface of an alternate embodiment of the faceplate 600 according to the present invention. The embodiment shown in FIG. 6 is adapted to cover a GFCI electrical receptacle, having an substantially rectangular aperture 602 adapted to receive a GFCI outlet. In addition, it would be apparent to one skilled in the art, that faceplate 600 can be adapted to cover various electric or electrical components as also shown and described, for example in FIGS. 2 and 7. The faceplate according to the present invention is selectively interchangeable according to the needs of a user. Alternate embodiments of faceplate 600 are adapted to cover a variety electrical components.

In addition, FIG. 6 depicts apertures 216*b* having a keyhole shape for attaching the faceplate to a wall outlet, such as a receptacle box. The key hole apertures includes a substantially circular opening 610, a slotted region 612 and a concave depression 614 surrounding the slotted region. The circular opening 610 is adapted for receiving an outwardly flanged fastener head, such as a screw head (not shown). The inner diameter of the circular opening 610 is substantially equal to the diameter of the fastener head to be received. Extending radially from the outer circumference of the circular opening is slotted region 612, which has a width less than the diameter of the circular opening and substantially equal to the diameter of the fastener shank to be received. Furthermore, there is provided a concave depression surrounding the slotted region, for retaining the fastener head.

In use, faceplate 600 is affixed to a wall outlet by positioning the circular openings 610 in alignment with fasteners that are secured to a mounting box. The head of the fasteners, typically screws, protrude through circular openings 610 once the faceplate has been attached to the mounting box. Faceplate 600 is then displaced laterally such that the fastener shank is received by slotted region 612 while the fastener head is retained within the concave depression thereby securely retaining the faceplate to the mounting box.

Also shown in FIG. 6 is a detailed view of hinge support sockets 112 and 128, comprising an arched structure 616, with a curved interior 618 an exterior 620 and a hinge pin retaining tab 622. The interior 618 portion is adapted to concentrically receive either hinge pin 114 or 208 of cover 100. Hinge socket 128 is mounted on faceplate 600 such that interior portion 618 is oriented towards the front of faceplate 600. By mounting the hinge socket in this way, hinge pin 114 can be rotatably engaged to hinge socket 128 either before or after faceplate 600 has been securely affixed to an electrical component mounting box.

In operation, the open portion of a hinge socket is fit over a hinge pin and snapped into place such that retaining tab 622 is elastically deformed to permit the hinge pin to fit concentrically within the arch interior 618. Once in place, retaining tab 622 resiliently bears upon the hinge pin to hold it within the hinge socket. Cover 100 can thereby be pivoted to rotate into an open or closed position.

Figure 7:
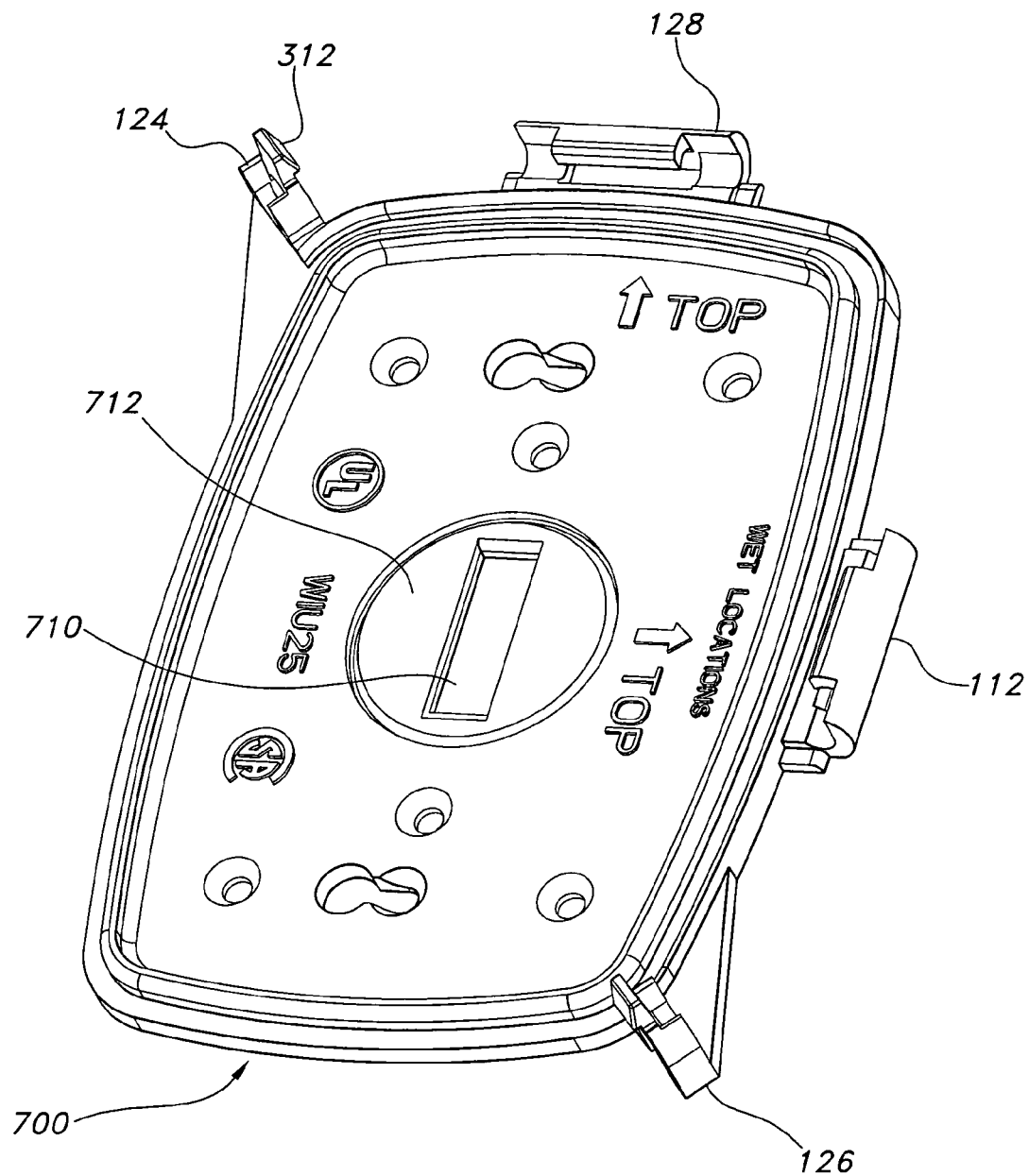
FIG. 7 is a perspective view of another alternate embodiment of the faceplate according to the present invention.

FIG. 7 depicts an alternate embodiment of a faceplate according to the present invention, having a rectangular knockout plug 710, adapted for use with a light switch, for example, and a circular knockout plug 712 adapted to receive a single round receptacle, such as, for example, an electrical socket typically used for 220v service. The faceplate can be adapted to either use by removing the appropriate knockout plug, however, once the knockout plug is removed, it can not be replaced. In addition, while the faceplate of FIG. 7 is depicted as having a round and rectangular knockout plug, it would be apparent to have a faceplate having knockout plugs of a variety of alternate shapes for use with different electrical components.

Figure 2:
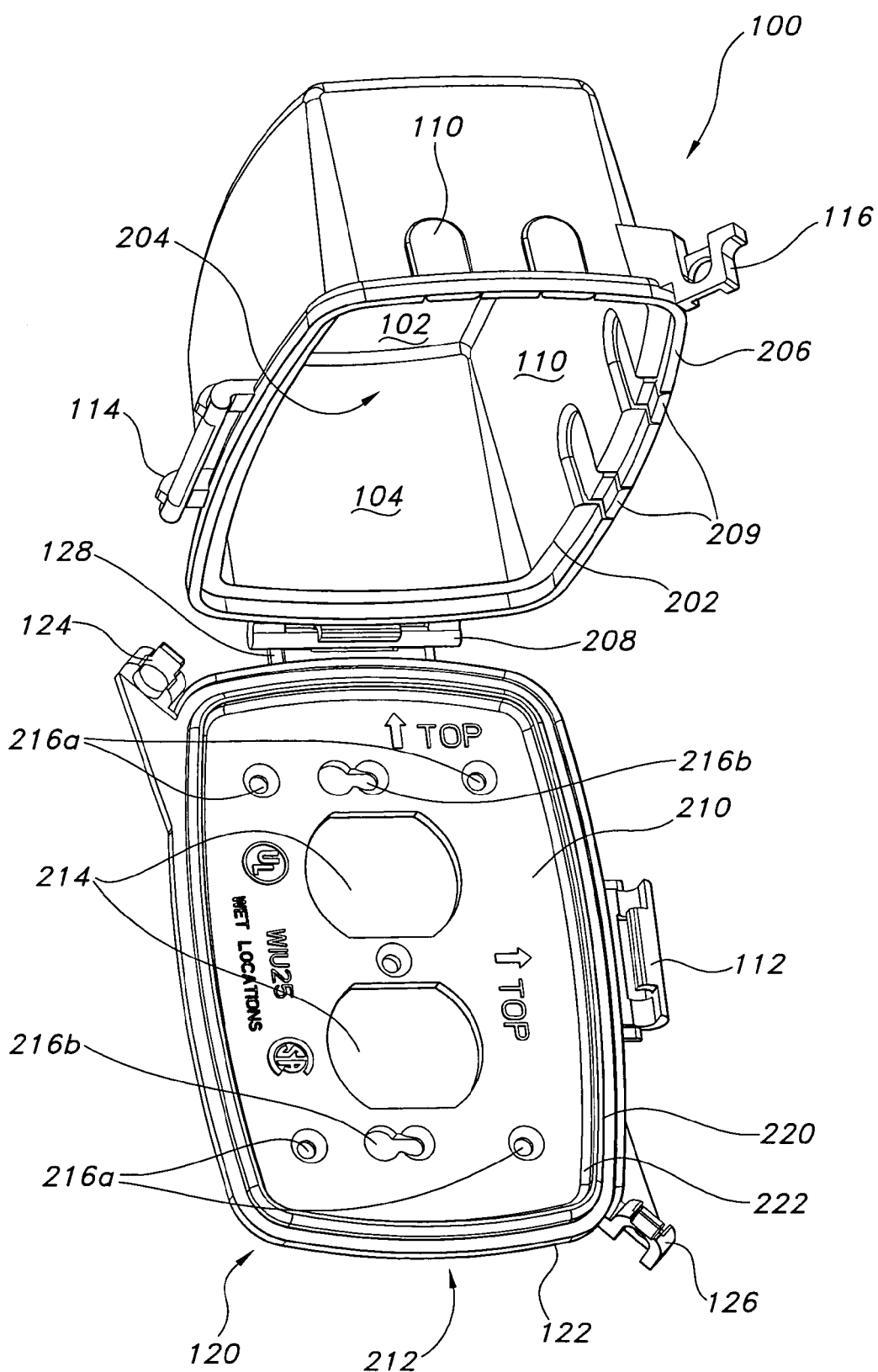
FIG. 2 is a perspective view of the electrical connector box cover and attached faceplate in a vertical position, the cover and faceplate being shown in a open position.

The faceplate embodiments depicted in FIGS. 2, 6 and 7 are exemplary only, since it would be apparent to have a faceplate according to the present invention adapted to receive a variety of alternate electrical components.

Figure 8:
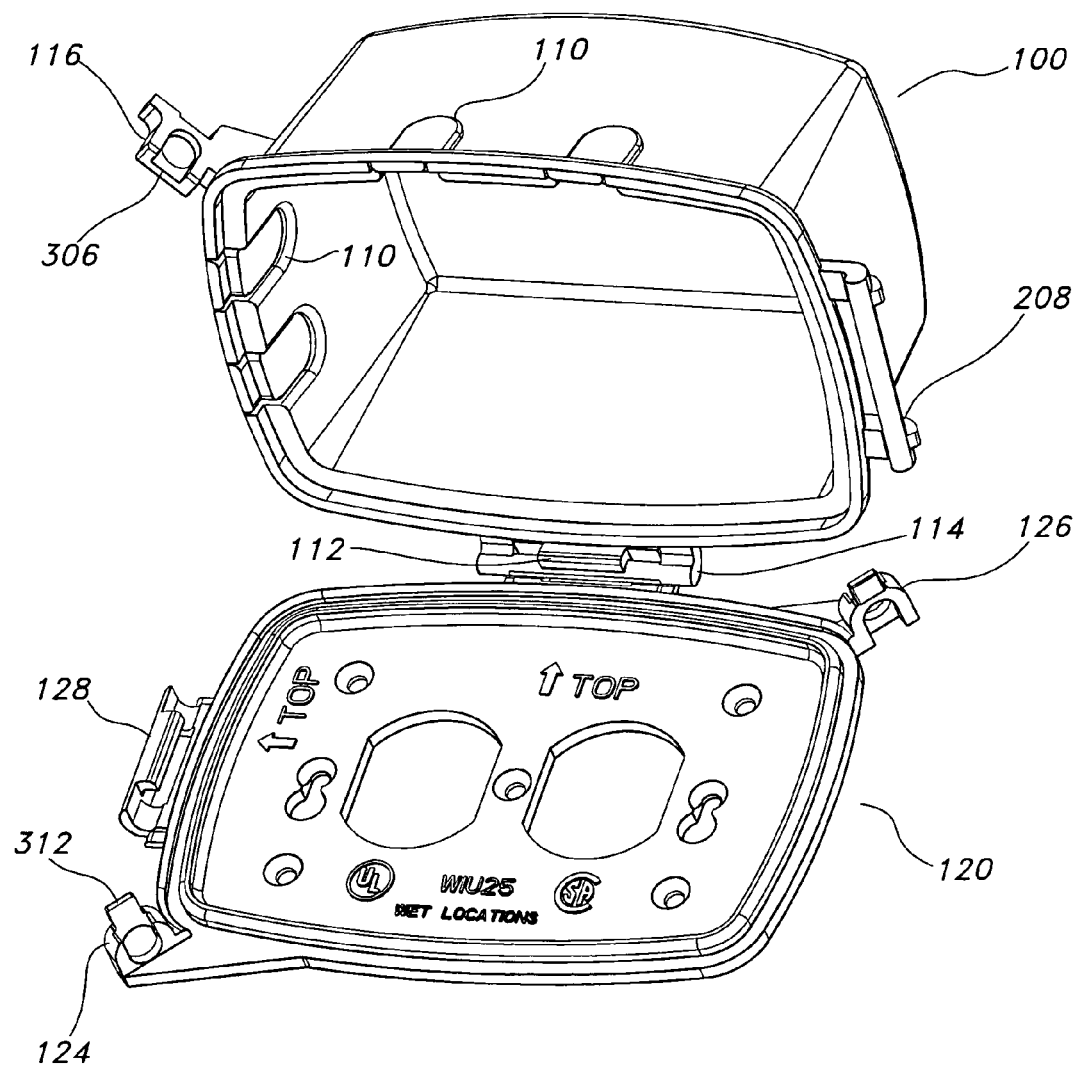
FIG. 8 is a perspective view of the electrical connector box cover and attached faceplate in a horizontal position, the cover and faceplate being in an open position.

FIG. 8 depicts the electrical connector box cover 100 and faceplate 120 of the present invention in the open horizontal orientation, wherein cover 100 is rotated 180 degrees from the orientation depicted in FIG. 2 with respect to faceplate 120. In this view, hinge pin 114 and hinge socket 112 are pivotally engaged. While in either the horizontal or vertical position, the unused hinge socket and pin are positioned along opposite parallel sides of the faceplate and cover device respectively. Such arrangement prevents the unused hinge components from interfering with the opening and closing of the cover. Furthermore, in the horizontal orientation, cover locking device 116 engages with faceplate locking device 124. Locking element 126 is not engaged in the orientation shown in FIG. 8.

In operation, the faceplate, is rigidly mounted on an electrical component box, typically using screws. The component box can be an in-wall installation, or surface mounted wherein the box is affixed to a building structure, such as a wall or column. In one embodiment of the present invention, there is provided one outlet box cover 100 together with multiple faceplates, such as, for example those depicted in FIGS. 2, 7 and 8. The faceplate can be selectively chosen from among those provided to cover the electrical component, and mounted on an outlet box in either a horizontal orientation or vertical orientation. Unused faceplates can be discarded. Once faceplate 120 is securely mounted, the cover is attached to the faceplate using the hinges provided. The hinge sockets located on faceplate 120 are oriented such that the hinge pin can be pushed into the hinge socket and thereby resiliently retained by tab 622. The hinge socket orientation, makes it possible to affixed the cover to the faceplate after the faceplate is securely mounted to the wall. To affix cover 100 to faceplate 120, either hinge socket 128 or 112 is pivotally engaged to the corresponding horizontal 114 or vertical 208 hinge pin respectively. Either set of hinges can be selectively engaged without the need to modify the faceplate or the cover. It should also be understood that other intermating structure are equally suitable such that the described pin and socket interconnection is not the only structure usable for securing the cover to the faceplate. For example, the pin structure described could be secured to the faceplate and the socket structure could be secured to the cover. Bayonet, ball, male/female and even hermaphroditic structure are equally suitable for this purpose. Furthermore, there is no necessity that the intermating structure on the faceplate be the same nor is there any necessity that the intermating structure on the cover be the same. It is only necessary that the respective intermating structure on the cover and faceplate be configured to intermate or engage each other.

In the preferred embodiment of the present invention, the faceplate and cover are mounted such that the cover opens by pivoting in an upward direction. For example, the faceplate is mounted with either a vertical or horizontal hinge socket positioned at the top wherein the corresponding cover hinge pin is pivotally engaged to that socket. Alternately, it is also possible to open the cover in a downward or lateral direction by positioning a hinge socket at the bottom or side of the faceplate respectively, and pivotally engaging the corresponding hinge socket. Either orientation can be achieved without any modification to the faceplate or cover.

Once the faceplate and cover are pivotally engaged and the cover is closed, the preferred embodiment includes a locking device to maintain the cover in a closed position. As previously described, the locking device may include an annular ring for engaging a lock shank such as a padlock and a latching mechanism such as, for example, the snap device depicted and described in FIG. 3.

It will be appreciated that the present invention has been described herein with reference to certain preferred or exemplary embodiments. The preferred or exemplary embodiments described herein may be modified, changed, added to or deviated from without departing from the intent, spirit and scope of the present invention. It is intended that all such additions, modifications, amendments, and/or deviations be included within the scope of the claims appended hereto.

I claim:

1. A weatherproof electrical outlet box assembly for shielding and protecting electrical components from moisture comprising:

a faceplate for attaching to an outlet box, said faceplate being substantially planar, and perimetrically bounded by a substantially rectangular side edge, said faceplate having at least one aperture for receiving an electrical component and; said faceplate including a pair of first hinge mating assemblies extending from said side edge in substantially orthogonal orientation;

a cover having a front wall, an opposed open end and a substantially rectangular perimetrical side wall therebetween defining a cover interior, said side wall having a rim bounding said open end, said cover including a at least one access port through said side wall adjacent said open end for providing separate passageways into the interior of said cover; and further including a pair of removable second hinge mating assemblies for cooperatively engaging said first hinge mating assemblies to side wall adjacent said open end in substantially orthogonal orientation; and said cover being pivotally affixed to said faceplate by operative engagement of one of said first hinge mating assemblies with one of said second hinge mating assemblies of corresponding orientation by rotating said cover to align with the orientation of said faceplate and movable between an open and a closed position while said pair of removable second hinge mating assemblies remain intact and wherein said pair of first hinge assemblies and said pair of removable second hinge mating assemblies that are not in operative engagement are not aligned.

2. A weatherproof electrical outlet box assembly according to claim 1, wherein said outlet box assembly has a locking device such that when said cover is moved into said closed position said locking device is operatively engaged thereby releasably locking said cover in said closed position.

3. A weatherproof electrical outlet box assembly according to claim 2, wherein said locking device comprises stanchions supporting concentrically aligned holes for receiving a lock shank.

4. A weatherproof electrical outlet box assembly according to claim 1, wherein said faceplate includes a plurality of fastener holes for receiving fasteners for attaching said faceplate to said outlet box.

5. A weatherproof electrical outlet box assembly according to claim 1, wherein said access port is covered by a knockout, said knockout being formed of at least one frangible projection extending from said cover over said access port, said projection being removable to allow for the passage of one or more wires into said cover.

6. A weatherproof electrical outlet box assembly according to claim 1, wherein said faceplate aperture is covered by a knockout, said knockout being formed of at least one frangible projection extending from said faceplate over said aperture, said projection being removable to allow said faceplate to receive an electrical component.

7. A weatherproof electrical outlet box assembly according to claim 1, wherein said faceplate further has a front side and a back side, and wherein said first hinge mating assemblies are comprised of a cylindrical member, having an open portion for receiving a said second hinge mating assembly thereon.

8. A weatherproof electrical outlet box cover assembly according to claim 1, wherein said first hinge mating assemblies are configured to engage and permit the rotation of said second hinge mating assembly thereabout.

9. A weatherproof electrical outlet box cover assembly according to claim 1, wherein said second hinge mating assemblies are comprised of a circular or curved member configured to engage and pivot with respect to said first hinge mating assembly.

10. A weatherproof electrical outlet box cover assembly according to claim 1, wherein said first and second hinge mating assemblies are hermaphroditic.

11. A weatherproof electrical outlet box cover assembly according to claim 1, wherein said first and second hinge mating assemblies are configured of complementary male/female components.

12. A weatherproof electrical outlet box assembly according to claim 1, wherein said faceplate further has a continuous raised protrusion extending from said front side bordering said side edge.

13. A weatherproof electrical outlet box assembly according to claim 12, wherein said faceplate further includes a concave depression adjacent the inside edge of said continuous raised protrusion.

14. A weatherproof electrical outlet box cover kit which is characterized in that it comprises:
- a single cover having a front wall, an opposed open end and a substantially rectangular perimetrical side wall therebetween defining a cover interior, said side wall having a rim bounding said open end, said cover including at least one access port through said side wall adjacent said open end for providing separate passageways into the interior of said cover; said cover including a first intermating structure and a second intermating structure extending respectively from said side wall adjacent said open end in substantially orthogonal orientation;
- a plurality of faceplates for attaching to an outlet box, said faceplate being substantially planar, and perimetrically bounded by a substantially rectangular side edge, wherein each of said faceplates is adapted for receiving a predetermined electrical component and; and further including a third intermating structure and a fourth intermating structure for attaching to said faceplate side edge in substantially orthogonal orientation;

wherein said cover can be selectively mounted to one of said plurality of faceplates by being pivotally affixed to said one faceplate by operative engagement of one of said third or fourth intermating structure with one of said first or second intermating structure of corresponding orientation while said first, second, third and fourth of said intermating structures are intact and movable between an open and a closed position and wherein said intermating structures that are not in operative engagement are not aligned.

15. A weatherproof electrical outlet box assembly according to claim 14, further including a locking device such that when said cover is moved into said closed position said locking device is operatively engaged thereby releasably locking said cover in said closed position.

16. A weatherproof electrical outlet box assembly according to claim 14, wherein said faceplate includes a plurality of fastener holes for receiving fasteners for attaching said faceplate to said outlet box.

17. A weatherproof electrical outlet box assembly according to claim 14, wherein said access port is covered by a knockout, said knockout being formed of at least one frangible projection extending from said cover over said access port, said projection being removable to allow for the passage of one or more wires into said cover.

18. A weatherproof electrical outlet box assembly according to claim 14, wherein said faceplate aperture is covered by a knockout, said knockout being formed of at least one frangible projection extending from said faceplate over said aperture, said projection being removable to allow said faceplate to receive an electrical component.

19. A weatherproof electrical outlet box assembly according to claim 14, wherein said locking device comprises stanchions supporting concentrically aligned holes for receiving a lock shank.

20. A weatherproof electrical outlet box assembly according to claim 14, wherein said faceplate further has a front side and a back side, and wherein said first and said second hinge intimating structure are comprised of a cylindrical member, having an open portion for receiving one of said third or fourth intermating structures therein.

21. A weatherproof outlet box assembly according to claim 14, wherein said first and said second intermating structure are configured to engage and permit the rotation of, respectfully, said third or fourth intermating structure thereabout.

22. A weatherproof outlet box assembly according to claim 14, wherein one or both of said third and fourth intermating structure comprise a circular or curved member configured to engage and pivot with respect to its respective first or second intermating structure.

23. A weatherproof outlet box assembly according to claim 14, wherein one or both combinations of intermating structures are hermaphroditic.

24. A weatherproof outlet box assembly according to claim 14, wherein one or both combinations of intermating structures are configured of complementary male/female components.

25. A weatherproof electrical outlet box assembly according to claim 14, wherein said faceplate further has a continuous raised protrusion extending from said front side bordering said side edge.

26. A weatherproof electrical outlet box assembly according to claim 25, wherein said faceplate further includes a concave depressions adjacent the inside edge of said continuous raised protrusion.

27. A weatherproof electrical outlet box assembly according to claim 14, wherein any one of said first, second, third and fourth of said intermating structures can be removed.

* * * * *

UNITED STATES PATENT AND TRADEMARK OFFICE
CERTIFICATE OF CORRECTION

PATENT NO.         : 7,241,952 B2                                    Page 1 of 1
APPLICATION NO.    : 10/901392
DATED              : July 10, 2007
INVENTOR(S)        : Cong Thanh Dinh It is certified that error appears in the above-identified patent and that said Letters Patent is hereby corrected as shown below:

On the Title page, replace "(74) Attorney, Agent, or Firm - Hoffman & Baron, LLP" with --(74) Attorney, Agent, or Firm - Hoffmann & Baron, LLP--;

Column 1, lines 35-36, replace "the wires installed and connected to the" with --the wires are installed and connected to the--;

Column 2, line 16, replace "cover including a at least one" with --cover including at least one--;

Column 5, line 59, replace "a variety electrical components" with --a variety of electrical components--;

Column 7, line 17, replace "possible to affixed the cover" with --possible to affix the cover--;

Column 8, claim 1, lines 11-12, replace "including a at least one" with --including at least one--; and Column 9, claim 14, line 36, replace "component and; and further" with --component and further--.

Signed and Sealed this

Ninth Day of October, 2007

JON W. DUDAS
*Director of the United States Patent and Trademark Office*